US012624769B2

(12) United States Patent
Liang et al.

(10) Patent No.: US 12,624,769 B2
(45) Date of Patent: May 12, 2026

(54) ADJUSTABLE CONSTANT PRESSURE DEVICE

(71) Applicant: S-BEAM PRECISION PRODUCTS LIMITED, Zhongshan (CN)

(72) Inventors: Shenggen Liang, Zhongshan (CN); Dingxiang Yuan, Zhongshan (CN)

(73) Assignee: S-BEAM PRECISION PRODUCTS LIMITED, Zhongshan (CN)

( * ) Notice: Subject to any disclaimer, the term of this patent is extended or adjusted under 35 U.S.C. 154(b) by 162 days.

(21) Appl. No.: 18/777,532

(22) Filed: Jul. 18, 2024

(65) Prior Publication Data

US 2025/0237319 A1 Jul. 24, 2025

(30) Foreign Application Priority Data

Jan. 23, 2024 (CN) .......................... 202410098684.7

(51) Int. Cl.
 *F16K 17/06* (2006.01)
 *F16K 15/06* (2006.01)
 *F41B 11/723* (2013.01)
(52) U.S. Cl.
 CPC ............ *F16K 17/06* (2013.01); *F16K 15/065* (2021.08); *F41B 11/723* (2013.01)
(58) Field of Classification Search
 CPC .... F41B 11/723; F16K 15/026; F16K 15/065; F16K 17/06
 See application file for complete search history.

(56) References Cited

U.S. PATENT DOCUMENTS

| | | | | |
|---|---|---|---|---|
| 8,985,094 B2 * | 3/2015 | Deng | ...................... | F23D 14/64 |
| | | | | 137/119.06 |
| 10,337,633 B2 * | 7/2019 | Grenaway | ............... | F16K 17/06 |
| 10,767,776 B2 * | 9/2020 | Kruppe | .................. | F16K 17/04 |
| 11,353,128 B2 * | 6/2022 | Sharpe | ................... | F16K 17/06 |

* cited by examiner

*Primary Examiner* — Kevin F Murphy
(74) *Attorney, Agent, or Firm* — MATTHIAS SCHOLL P.C.; Matthias Scholl

(57) ABSTRACT

An adjustable constant pressure device including a connector, a sealing shaft, and a constant pressure assembly, and a mobile mechanism. The connector includes an axially extended assembly channel. The sealing shaft and the constant pressure assembly are disposed in the assembly channel. The sealing shaft includes a sealing channel and an air outlet communicating with the sealing channel. The constant pressure assembly includes one end axially oriented to the air outlet, and the end is sealed. The constant pressure assembly includes a constant pressure channel. When an air pressure in the constant pressure channel is higher than that in the sealing channel, the constant pressure assembly moves along the assembly channel to seal the air outlet. When the air pressure in the constant pressure channel is lower than that in the sealing channel, the constant pressure assembly moves along the assembly channel to open the air outlet.

10 Claims, 6 Drawing Sheets

ADJUSTABLE CONSTANT PRESSURE DEVICE

CROSS-REFERENCE TO RELATED APPLICATIONS

Pursuant to 35 U.S.C. § 119 and the Paris Convention Treaty, this application claims foreign priority to Chinese Patent Application No. 202410098684.7 filed Jan. 23, 2024, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to an adjustable constant pressure device.

Air gun utilizes compressed air to fire bullets. To avoid the impact of the unstable air pressure on the shooting speed, shooting distance and shooting accuracy, a constant pressure device is disposed on the air gun. Conventional constant pressure devices include a housing, a constant pressure shaft, a disc spring, and a sealing shaft. The sealing shaft is fixedly connected to the housing and has a sealing channel. The constant pressure shaft is slidably connected to the housing. The constant pressure shaft includes a constant pressure channel and a sealed end oriented to the sealing shaft. The constant pressure shaft moves spontaneously away from the sealing shaft when the air pressure inside the constant pressure channel is lower than that inside the sealing channel to increase the pressure; the constant pressure shaft moves spontaneously to lean against the sealing shaft when the air pressure inside the constant pressure channel is higher than that inside the sealing channel.

The movement of the constant pressure shaft to lean against the sealing shaft is defined as a fitting stroke, and the constant pressure value of the constant pressure device is closely related to the fitting stroke; a large fitting stroke results in a large constant pressure value, and a small fitting stroke results in a small constant pressure value. Since the sealing shaft is fixed in the housing, the fitting stroke of the constant pressure shaft is fixed, which results in the constant pressure value of the constant pressure device not being adjustable, making the use of the air gun inconvenient.

SUMMARY

To solve the aforesaid problem, one objective of the disclosure is to provide an adjustable constant pressure device comprising a connector, a sealing shaft, and a constant pressure assembly, and a mobile mechanism. The connector comprises an axially extended assembly channel; the sealing shaft and the constant pressure assembly are disposed in the assembly channel; the sealing shaft comprises a sealing channel and an air outlet communicating with the sealing channel; the constant pressure assembly comprises one end axially oriented to the air outlet, and the end is sealed; the constant pressure assembly comprises a constant pressure channel; when an air pressure in the constant pressure channel is higher than that in the sealing channel, the constant pressure assembly moves along the assembly channel to seal the air outlet; when the air pressure in the constant pressure channel is lower than that in the sealing channel, the constant pressure assembly moves along the assembly channel to open the air outlet; the mobile mechanism is connected to the connector and the sealing shaft, and is configured to move to drive the sealing shaft to move along the assembly channel.

In a class of this embodiment, the mobile mechanism comprises an adjusting wheel annularly disposed on the connector and a moving member attached to the sealing shaft; the adjusting wheel is rotatable relative to the connector, and when the adjusting wheel rotates relative to the connector, the moving member drives the sealing shaft to move along the assembly channel.

In a class of this embodiment, the connector comprises a guide channel, and the moving member is extended into and limited in the guide channel and is unable to rotate with respect to the connector; the moving member extends from the sealing shaft along the guide channel to one side of the adjusting wheel and is in threaded connection to the adjusting wheel, and when the adjusting wheel rotates, the moving member moves along the guide channel.

In a class of this embodiment, the guide channel runs through the connector in a radial direction of the connector, and the moving member is disposed through the connector along the guide channel and is in threaded connection to the adjustment wheel; and/or, the moving member is in threaded connection to the sealing shaft.

In a class of this embodiment, the sealing shaft is annularly provided with two seals; the two seals are against the sealing shaft and the assembly channel, respectively, and the guide channel is located between the two seals; an outer wall of the sealing shaft comprises two sealing grooves, and two seals are embedded in the two sealing grooves, respectively.

In a class of this embodiment, the guide channel divides the assembly channel into a front channel and a rear channel; the front channel communicates with the guide channel via a front opening; the rear channel communicates with the guide channel via a rear opening; the constant pressure assembly is disposed in the front channel; when the moving member approaches to one side of the front opening or one side of the rear opening, two ends of the sealing shaft are respectively inserted into the front channel and the rear channel.

In a class of this embodiment, the connector comprises a stop ring and a front housing which are respectively disposed on two sides of the adjusting wheel; the stop ring and the front housing are spaced apart in an axial direction of the connector to restrict an axial movement of the adjusting wheel on the connector.

In a class of this embodiment, the stop ring protrudes from an outer surface of the connector and is integrated with the connector; the front housing is annularly disposed on the connector and in threaded connection to the connector; the front housing comprises an air discharge passage communicating with the constant pressure channel, and the front housing comprises a bleeder valve connected to the air discharge passage; and/or, the connector comprises a rear housing on the side of the stop ring away from the front housing; the rear housing is located outside the connector and in threaded connection to the connector; the rear housing comprises an air inlet passage communicating with the sealing channel; an air inlet valve is disposed on the rear housing and connected to the air inlet passage and an air pressure gauge is disposed on one side of the air inlet valve.

In a class of this embodiment, an outer surface of the adjusting wheel comprises a plurality of non-slip grooves.

In a class of this embodiment, the constant pressure assembly comprises a constant pressure shaft, a seal head, and a disc spring; the constant pressure shaft is disposed in the assembly channel; the constant pressure channel is axially disposed in the constant pressure shaft; the constant pressure shaft comprises an air inlet communicating with the constant pressure channel and the assembly channel; the seal head is embedded in one end of the constant pressure assembly and faces the air outlet; the seal head is spaced apart from the assembly channel; a portion of the constant pressure shaft from the seal head to the air inlet is spaced apart from the assembly channel; the disc spring is annularly disposed on the constant pressure shaft to actuate the constant pressure shaft to move toward the sealing shaft to seal the air outlet.

The following advantages are associated with the adjustable constant pressure device of the disclosure. The adjustable constant pressure device of the disclosure is provided with the mobile mechanism configured to move to drive the sealing shaft to move along the assembly channel to be close to or away from the constant pressure assembly, so that the fitting stroke of the constant pressure assembly is adjustable through adjusting the position of the sealing shaft, and the constant pressure value of the constant pressure device is adjustable. Thus, the user can quickly adjust the constant pressure value as needed, so that the adjustable constant pressure device is flexible and convenient for use.

DETAILED DESCRIPTION

To further illustrate the disclosure, embodiments detailing an adjustable constant pressure device are described below. It should be noted that the following embodiments are intended to describe and not to limit the disclosure.

Figure 1:
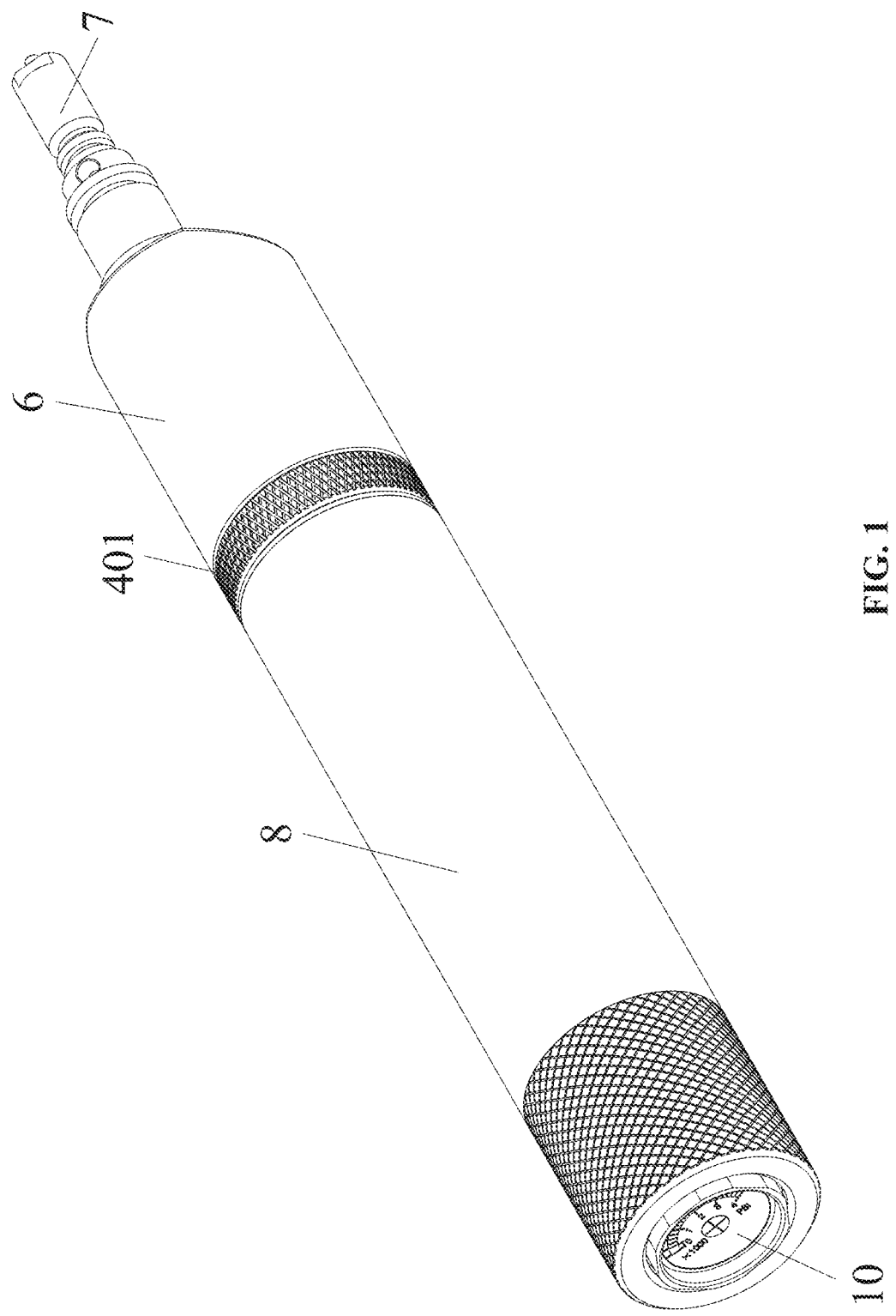
FIG. 1 is a schematic diagram of an adjustable constant pressure device in one embodiment of the disclosure.
Figure 2:
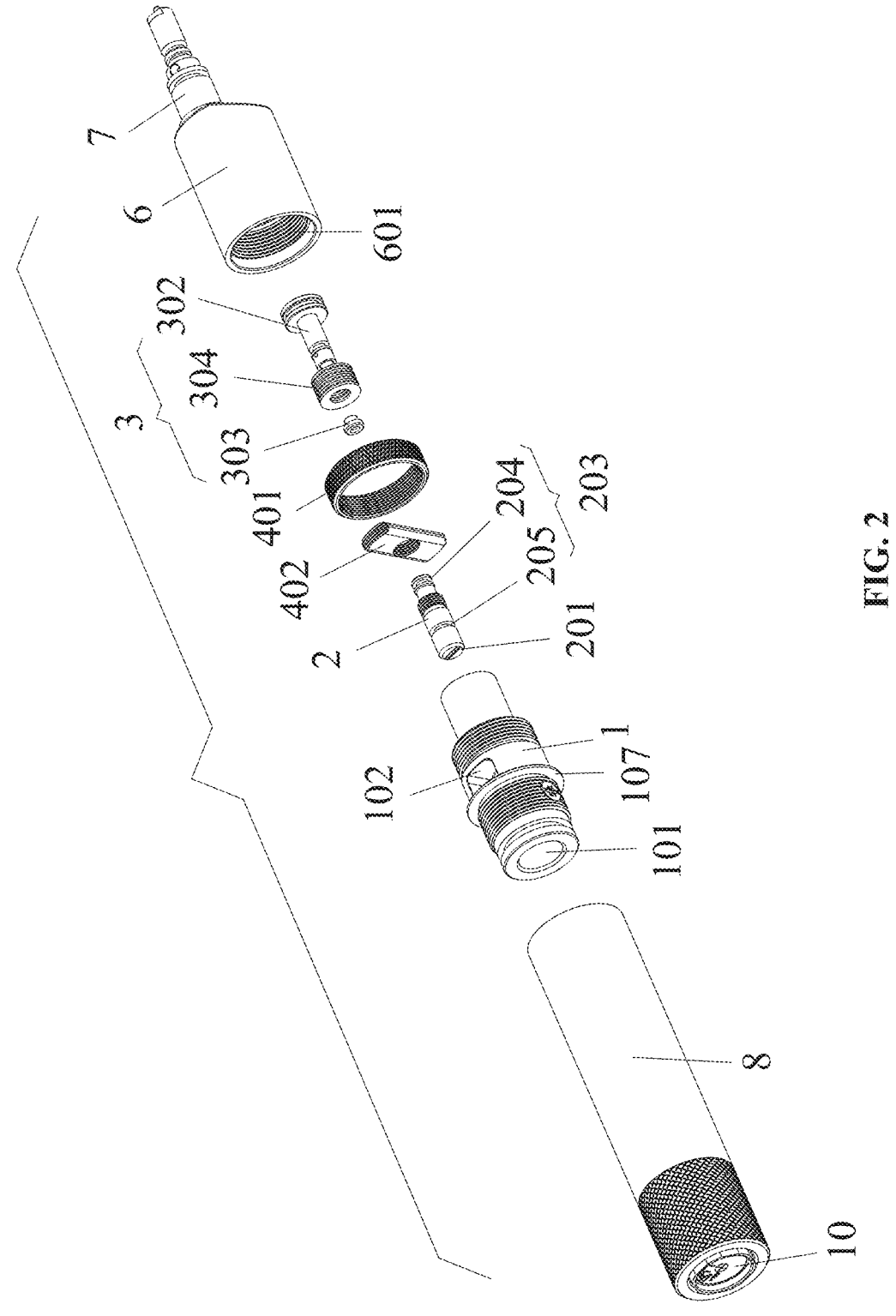
FIG. 2 is an exploded view of an adjustable constant pressure device in one embodiment of the disclosure.
Figure 3:
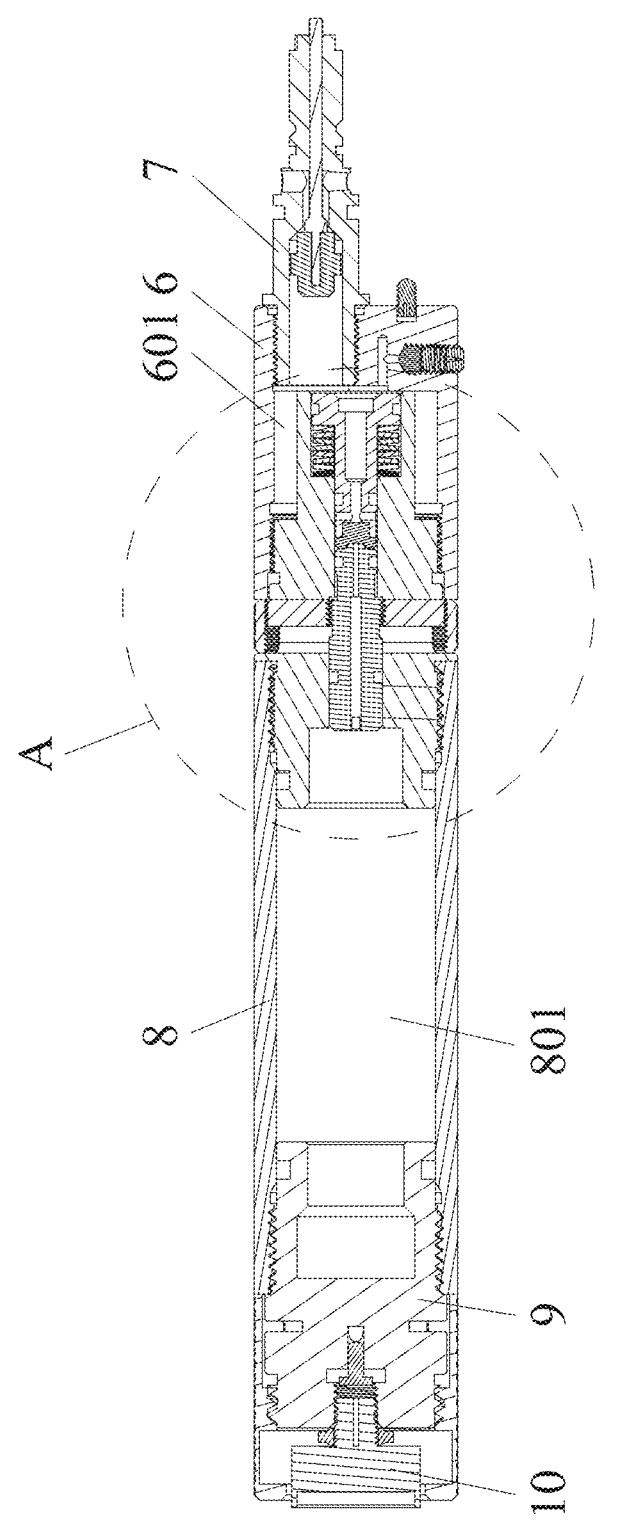
FIG. 3 is a sectional view of an adjustable constant pressure device in one embodiment of the disclosure (not showing the front cover)
Figure 4:
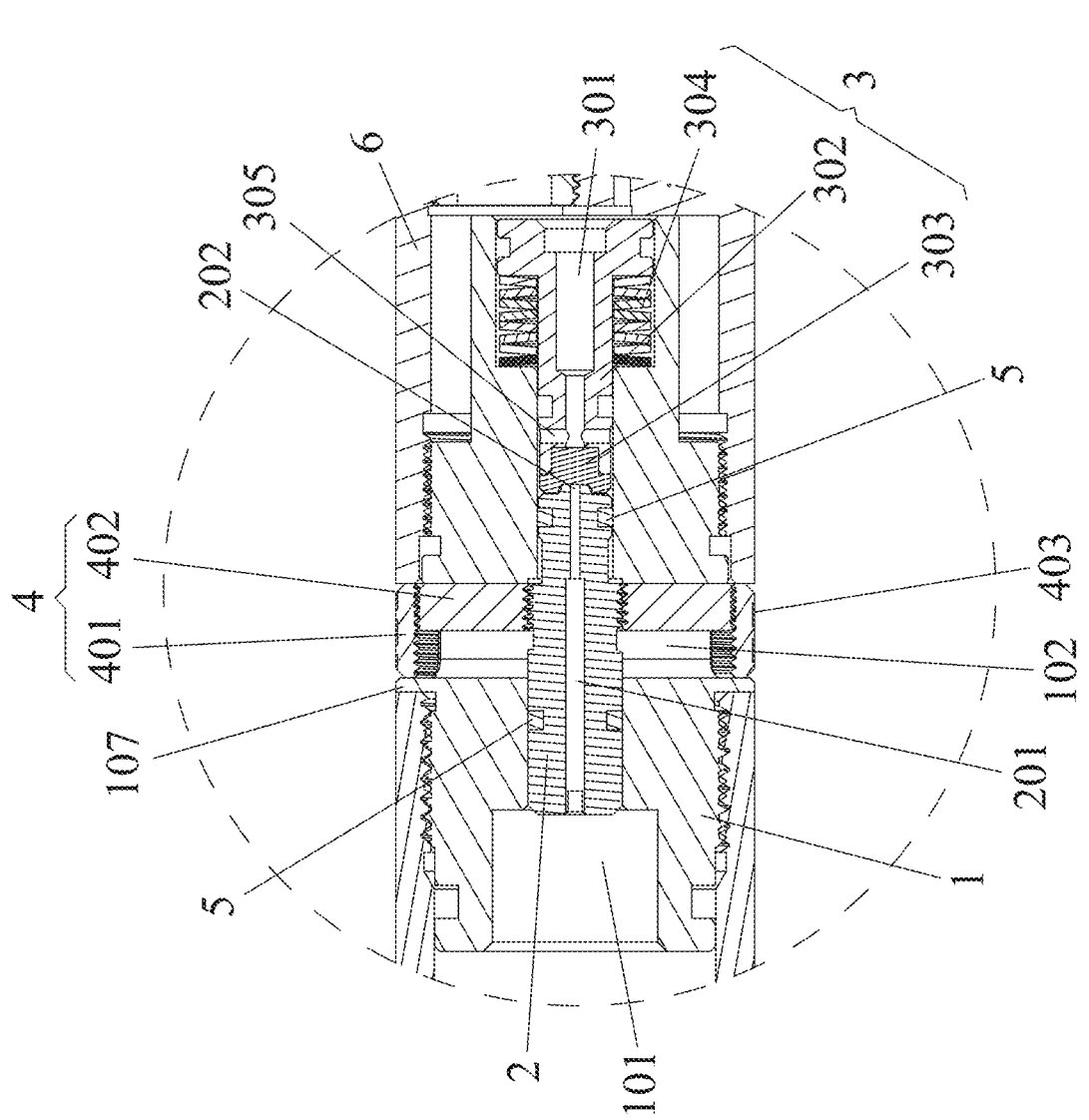
FIG. 4 is a local enlarged view of part A in FIG. 3.
Figure 5:
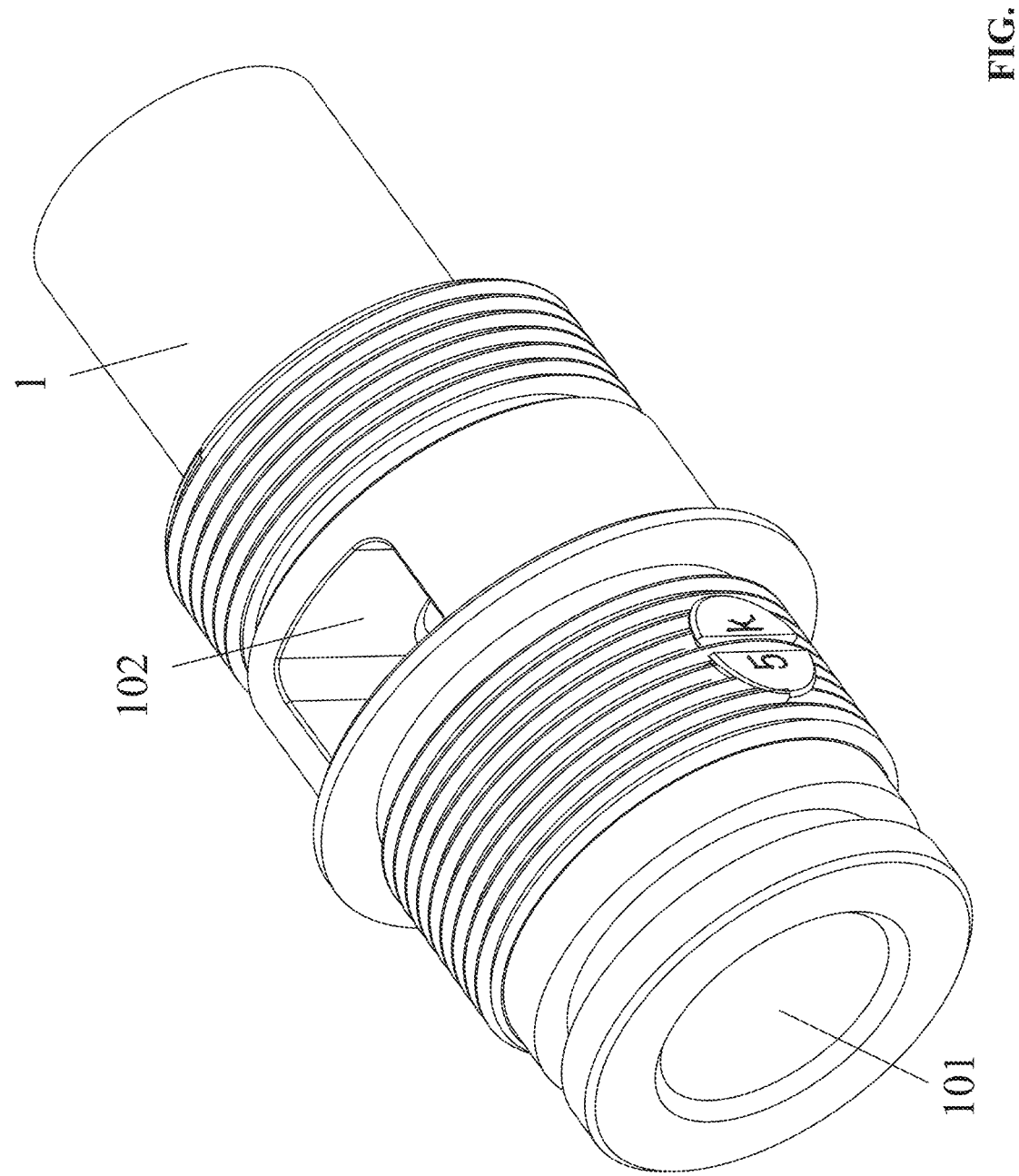
FIG. 5 is a schematic diagram of a connector in one embodiment of the disclosure.
Figure 6:
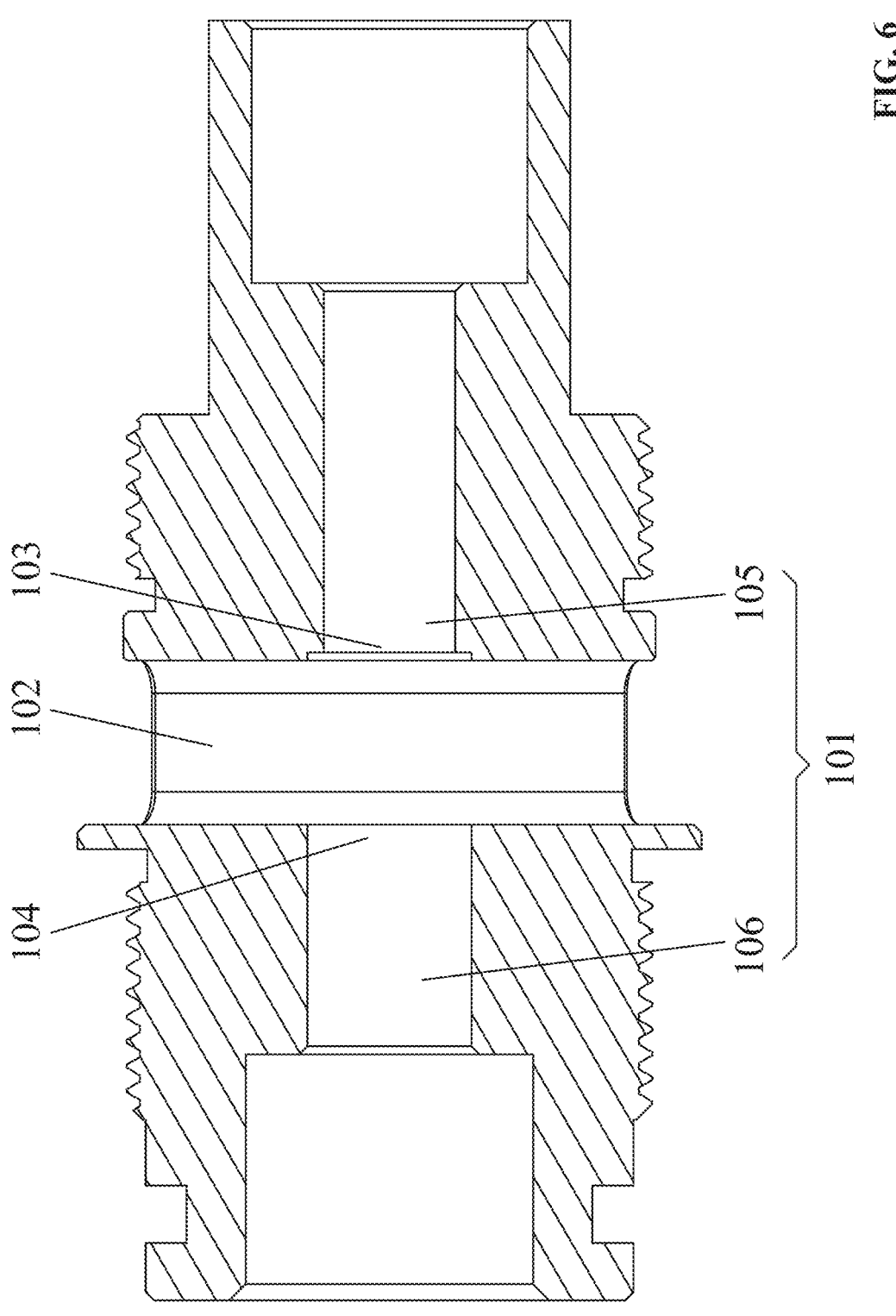
FIG. 6 is a sectional view of a connector in one embodiment of the disclosure.

As shown in FIGS. 1-6, the discourse provides an adjustable constant pressure device comprising a connector 1, a sealing shaft 2, and a constant pressure assembly 3. The connector 1 comprises an axially extended assembly channel 101. The sealing shaft 2 and the constant pressure assembly 3 are disposed in the assembly channel 101. The sealing shaft 2 comprises a sealing channel 201 and an air outlet 202 communicating with the sealing channel 201. The constant pressure assembly 3 comprises one end axially oriented to the air outlet 202, and the end is sealed. The constant pressure assembly 3 comprises a constant pressure channel 301. When the air pressure in the constant pressure channel 301 is higher than that in the sealing channel 201, the constant pressure assembly 3 moves along the assembly channel 101 to seal the air outlet 202. When the air pressure in the constant pressure channel 301 is lower than that in the sealing channel 201, the constant pressure assembly 3 moves along the assembly channel 101 to open the air outlet 202. The constant pressure device further comprises a mobile mechanism 4 connected to the connector 1 and the sealing shaft 2. The mobile mechanism 4 is configured to move to drive the sealing shaft 2 to move along the assembly channel 101 to be close to or away from the constant pressure assembly 3. The stroke of the constant pressure assembly 3 moving towards the sealing shaft 2 and abutting against the air outlet 202 is defined as a fitting stroke. When the mobile mechanism 4 drives the sealing shaft 2 to move closer to the constant pressure assembly 3 along the assembly channel 101, the fitting stroke of the constant pressure assembly 3 is shortened, and the constant pressure value decreases. When the mobile mechanism 4 drives the sealing shaft 2 to move away from the constant pressure assembly 3 along the assembly channel 101, the fitting stroke of the constant pressure assembly 3 is extended, and the constant pressure value increases. The sealing shaft of conventional constant pressure devices is fixedly connected to the casing, so that the fitting stroke of the constant pressure shaft 302 is fixed, the constant pressure value of the constant pressure device is unadjustable, leading to inconvenient use. The adjustable constant pressure device of the disclosure is provided with the mobile mechanism 4 configured to move to drive the sealing shaft 2 to move along the assembly channel 101 to be close to or away from the constant pressure assembly 3, so that the fitting stroke of the constant pressure assembly 3 is adjustable through adjusting the position of the sealing shaft 2, and the constant pressure value of the constant pressure device is adjustable. Thus, the user can quickly adjust the constant pressure value as needed, which is flexible and convenient for use.

In certain embodiments, the constant pressure assembly 3 comprises a constant pressure shaft 302, a seal head 303, and a disc spring 304. The constant pressure shaft 302 is disposed in the assembly channel 101. The constant pressure channel 301 is axially disposed in the constant pressure shaft 302. The constant pressure shaft 302 comprises an air inlet 305 communicating with the constant pressure channel 301 and the assembly channel 101. The seal head 303 is embedded in one end of the constant pressure assembly 3 and faces the air outlet 202. The outer surface of the seal head 303 is spaced apart from the assembly channel 101. The portion of the outer surface of the constant pressure shaft 302 from the seal head 303 to the air inlet 305 is spaced apart from the assembly channel 101. The disc spring 304 is annularly disposed on the outer surface of the constant pressure shaft 302 to actuate the constant pressure shaft 302 to move toward the sealing shaft 2 to seal the air outlet 202. When the air pressure in the constant pressure channel 301 is lower than the air pressure in the sealing channel 201, the constant pressure shaft 302 moves away from the sealing shaft 2 to open the air outlet 202, and therefore, the air flows from the air outlet 202 into the gap between the constant pressure shaft 302 and the assembly channel 101 and flows into the constant pressure channel 301 via the air inlet 305, to realize the inflation/boosting of the constant pressure channel 301; when the air pressure in the constant pressure channel 301 is higher than the air pressure in the sealing channel 201, the constant pressure shaft 302 moves against the sealing shaft 2 to seal the air outlet 202.

In certain embodiments, the mobile mechanism 4 comprises an adjusting wheel 401 annularly disposed on the connector 1 and a moving member 402 attached to the sealing shaft 2. The adjusting wheel 401 is rotatable relative to the connector 1, and when the adjusting wheel 401 rotates relative to the connector 1, the moving member 402 drives the sealing shaft 2 to move along the assembly channel 101 nearer to or farther away from the constant pressure shaft 302. The counterclockwise rotation of the adjusting wheel 401 increases the value of the constant pressure, and the clockwise rotation of the adjusting wheel 401 decreases the value of the constant pressure. Because the mobile mechanism 4 comprises the adjusting wheel 401 that can rotate relative to the connector 1 and the moving member 402 that drives the sealing shaft 2 to move when the adjusting wheel 401 rotates, the sealing shaft 2 can be moved closer to or farther away from the constant pressure shaft 302 along the assembling channel 101 to regulate the fitting stroke of the constant pressure assembly 3. The structure is simple and the operation is easy to implement.

In certain embodiments, the connector 1 comprises a guide channel 102, and the moving member 402 is extended into and limited in the guide channel 102, and is unable to rotate with respect to the connector 1. The moving member 402 extends from the sealing shaft 2 along the guide channel 102 to one side of the adjusting wheel 401 and is in threaded connection to the adjusting wheel 401, and when the adjusting wheel 401 rotates, the moving member 402 moves along the guide channel 102. In this way, the moving member 402 has good movement stability during the rotation of the adjusting wheel 401, thus avoiding deflection. The moving member 402 has a good connection stability with the adjusting wheel 401, ensuring the stable driving of the moving member.

In certain embodiments, the guide channel 102 runs through the connector 1 in the radial direction of the connector 1, and the moving member 402 is disposed through the connector 1 along the guide channel 102 and is in threaded connection to the adjustment wheel 401. Thus, the moving member 402 has a good connection stability with the adjusting wheel 401, ensuring the stable driving of the moving member.

In certain embodiments, the moving member 402 is in threaded connection to the sealing shaft 2. Thus, the moving member 402 is detachably fixedly connected to the sealing shaft 2, which is easy to disassemble.

In certain embodiments, the guide channel 102 divides the assembly channel 101 into a front channel 105 and a rear channel 106. The front channel 105 communicates with the guide channel 102 via a front opening 103; and the rear channel 106 communicates with the guide channel 102 via a rear opening 104. The constant pressure assembly 3 is disposed in the front channel 105. When the moving member 402 approaches to one side of the front opening 103 or one side of the rear opening 104, the two ends of the sealing shaft 2 are respectively inserted into the front channel 105 and the rear channel 106. In this way, when the sealing shaft 2 moves along the assembly channel 101, the two ends thereof are always respectively located on both sides of the guiding channel 102 of the connector 1, ensuring the connection stability of the sealing shaft 2 and the connector 1.

In certain embodiments, the sealing shaft 2 is annularly provided with two seals 5; the two seals 5 are against the sealing shaft 2 and the assembly channel 101, respectively, and the guide channel 102 is located between the two seals 5. Thus, the sealing shaft 2 and the connector 1 have a good airtightness, preventing air leakage via the guiding channel 102.

In certain embodiments, the outer wall of the sealing shaft 2 comprises two sealing grooves 203, and two seals 5 are embedded in the two sealing grooves 203, respectively. Therefore, the combination of the seals and the sealing shaft 2 is stable.

In certain embodiments, the two sealing grooves 203 comprises a front groove 204 and a rear groove 205. When the moving member 402 approaches to one side of the front opening 103 or one side of the rear opening 104, the front groove 204 and the rear groove 205 are located in the front channel 105 and the rear channel 106, respectively. Thus, the sealing shaft 2 and the connector 1 have a good airtightness, preventing air leakage via the guiding channel 102.

In certain embodiments, the connector 1 comprises a stop ring 107 and a front housing 6 which are respectively disposed on two sides of the adjusting wheel 401; the stop ring 107 and the front housing 6 are spaced apart in the axial direction of the connector 1 to restrict the axial movement of the adjusting wheel 401 on the connector 1. In this way, the installation and driving of the adjusting wheel 401 are stable.

In certain embodiments, the stop ring 107 protrudes from the outer surface of the connector 1 and is integrated with the connector 1. The front housing 6 is annularly disposed on the connector 1 and in threaded connection to the connector 1. The front housing 6 comprises an air discharge passage 601 communicating with the constant pressure channel 301, and the front housing 6 comprises a bleeder valve 7 connected to the air discharge passage 601.

In certain embodiments, the connector 1 comprises a rear housing 8 on the side of the stop ring 107 away from the front housing 6; the rear housing 8 is located outside the connector 1 and in threaded connection to the connector 1; the rear housing 8 comprises an air inlet passage 801 communicating with the sealing channel 201; an air inlet valve 9 is disposed on the rear housing 8 and connected to the air inlet passage 801 and an air pressure gauge 10 is disposed on one side of the air inlet valve 9.

In certain embodiments, the outer surface of the adjusting wheel 401 comprises a plurality of non-slip grooves 403, which provides the adjusting wheel 401 with good non-slip performance and facilitates rotation.

It will be obvious to those skilled in the art that changes and modifications may be made, and therefore, the aim in the appended claims is to cover all such changes and modifications.

What is claimed is:

1. An adjustable constant pressure device, comprising:
a connector;
a sealing shaft;
a constant pressure assembly; and
a mobile mechanism;
wherein,
the connector comprises an axially extended assembly channel; the sealing shaft and the constant pressure assembly are disposed in the assembly channel;
the sealing shaft comprises a sealing channel and an air outlet communicating with the sealing channel;
the constant pressure assembly comprises one end axially oriented to the air outlet, and the end is sealed;
the constant pressure assembly comprises a constant pressure channel; when an air pressure in the constant pressure channel is higher than that in the sealing channel, the constant pressure assembly moves along the assembly channel to seal the air outlet; when the air pressure in the constant pressure channel is lower than that in the sealing channel, the constant pressure assembly moves along the assembly channel to open the air outlet; and
the mobile mechanism is connected to the connector and the sealing shaft, and is configured to move to drive the sealing shaft to move along the assembly channel.

2. The device of claim 1, wherein the mobile mechanism comprises an adjusting wheel annularly disposed on the connector and a moving member attached to the sealing shaft; the adjusting wheel is rotatable relative to the connector, and when the adjusting wheel rotates relative to the connector, the moving member drives the sealing shaft to move along the assembly channel.

3. The device of claim 2, wherein the connector comprises a guide channel; the moving member is extended into and limited in the guide channel, and is unable to rotate with respect to the connector; the moving member extends from the sealing shaft along the guide channel to one side of the adjusting wheel and is in threaded connection to the adjusting wheel, and when the adjusting wheel rotates, the moving member moves along the guide channel.

4. The device of claim 3, wherein the guide channel runs through the connector in a radial direction of the connector, and the moving member is disposed through the connector along the guide channel and is in threaded connection to the adjustment wheel; and/or, the moving member is in threaded connection to the sealing shaft.

5. The device of claim 4, wherein the guide channel divides the assembly channel into a front channel and a rear channel; the front channel communicates with the guide channel via a front opening; the rear channel communicates with the guide channel via a rear opening; the constant pressure assembly is disposed in the front channel; when the moving member approaches to one side of the front opening or one side of the rear opening, two ends of the sealing shaft are respectively inserted into the front channel and the rear channel.

6. The device of claim 3, wherein the sealing shaft is annularly provided with two seals; the two seals are against the sealing shaft and the assembly channel, respectively, and the guide channel is located between the two seals; an outer wall of the sealing shaft comprises two sealing grooves, and two seals are embedded in the two sealing grooves, respectively.

7. The device of claim 2, wherein the connector comprises a stop ring and a front housing which are respectively disposed on two sides of the adjusting wheel; the stop ring and the front housing are spaced apart in an axial direction of the connector to restrict an axial movement of the adjusting wheel on the connector.

8. The device of claim 7, wherein the stop ring protrudes from an outer surface of the connector and is integrated with the connector; the front housing is annularly disposed on the connector and in threaded connection to the connector; the front housing comprises an air discharge passage communicating with the constant pressure channel, and the front housing comprises a bleeder valve connected to the air discharge passage; and/or the connector comprises a rear housing on one side of the stop ring away from the front housing; the rear housing is located outside the connector and in threaded connection to the connector; the rear housing comprises an air inlet passage communicating with the sealing channel; an air inlet valve is disposed on the rear housing and connected to the air inlet passage, and an air pressure gauge is disposed on one side of the air inlet valve.

9. The device of claim 2, wherein an outer surface of the adjusting wheel comprises a plurality of non-slip grooves.

10. The device of claim 1, wherein the constant pressure assembly comprises a constant pressure shaft, a seal head, and a disc spring; the constant pressure shaft is disposed in the assembly channel; the constant pressure channel is axially disposed in the constant pressure shaft; the constant pressure shaft comprises an air inlet communicating with the constant pressure channel and the assembly channel; the seal head is embedded in one end of the constant pressure assembly and faces the air outlet; the seal head is spaced apart from the assembly channel; a portion of the constant pressure shaft from the seal head to the air inlet is spaced apart from the assembly channel; the disc spring is annularly disposed on the constant pressure shaft to actuate the constant pressure shaft to move toward the sealing shaft to seal the air outlet.

* * * * *